United States Patent
Paple et al.

(10) Patent No.: US 12,189,957 B2
(45) Date of Patent: Jan. 7, 2025

(54) MANAGEMENT OF INPUT-OUTPUT OPERATIONS IN USER SPACE

(71) Applicant: Dell Products L.P., Round Rock, TX (US)

(72) Inventors: Prasad Vishnu Paple, Bangalore (IN); Kundan Kumar, Bangalore (IN); Kurumurthy Gokam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 17/540,506

(22) Filed: Dec. 2, 2021

(65) Prior Publication Data

US 2023/0176740 A1 Jun. 8, 2023

(51) Int. Cl.
*G06F 3/01* (2006.01)
*G06F 3/06* (2006.01)

(52) U.S. Cl.
CPC .......... *G06F 3/0613* (2013.01); *G06F 3/0604* (2013.01); *G06F 3/0659* (2013.01); *G06F 3/067* (2013.01); *G06F 3/0683* (2013.01)

(58) Field of Classification Search
CPC .... G06F 3/0613; G06F 3/0604; G06F 3/0659; G06F 3/067; G06F 3/0683; G06F 3/061
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Kevin L Young
*Assistant Examiner* — Abdou K Seye
(74) *Attorney, Agent, or Firm* — Ryan, Mason & Lewis, LLP (57) ABSTRACT

An apparatus in one embodiment comprises a host device comprising a processor coupled to memory. The host device is configured to communicate over a network with at least one storage system. The host device is further configured to retrieve data corresponding to a plurality of processes for submitting a plurality of input-output operations to the at least one storage system, to identify one or more constraints on the plurality of processes based at least in part on the data; and to control submissions of the plurality of input-output operations to the at least one storage system based at least in part on the one or more constraints. The retrieval of the data, the identification of the one or more constraints and the control of the submissions are performed in a user space of the host device.

20 Claims, 5 Drawing Sheets

(56) References Cited

U.S. PATENT DOCUMENTS

| | | | |
|---|---|---|---|
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1* | 10/2019 | Tah | H04L 69/14 |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 11,386,023 B1* | 7/2022 | Tarikere | G06F 13/1668 |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0167258 A1* | 5/2020 | Chattopadhyay | G06F 9/5088 |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |
| 2021/0157502 A1 | 5/2021 | Rao et al. | |
| 2021/0181965 A1 | 6/2021 | Anchi et al. | |
| 2022/0413708 A1* | 12/2022 | Canepa | G06F 3/067 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

Vmware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

Wikipedia, "User Space," https://en.wikipedia.org/w/index.php?title=User_space&oldid=1052063093, Oct. 27, 2021, 3 pages.

Wikipedia, "cgroups," https://en.wikipedia.org/w/index.php?title=Cgroups&oldid=1050179936, Oct. 16, 2021, 7 pages.

S. McCarty, "Architecting Containers Part 1: Why Understanding User Space vs. Kernel Space Matters," https://www.redhat.com/en/blog/architecting-containers-part-1-why-understanding-user-space-vs-kernel-space-matters, Jul. 29, 2015, 10 pages.

Red Hat, "Chapter 3. Subsystems and Tunable Parameters," https://access.redhat.com/documentation/en-us/red_hat_enterprise_linux/6/html/resource_management_guide/ch-subsystems_and_tunable_parameters, Accessed Oct. 25, 2021, 9 pages.

Unix & Linux Stack Exchange, "What is difference between User space and Kernel space?" https://unix.stackexchange.com/questions/87625/what-is-difference-between-user-space-and-kernel-space, May 29, 2016, 10 pages.

* cited by examiner

MANAGEMENT OF INPUT-OUTPUT OPERATIONS IN USER SPACE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of a storage system. Different ones of the host devices can run different applications with varying workloads and associated TO patterns. Such host devices also generate additional TO operations in performing various data services such as replication and migration so as to meet business continuity requirements. The distribution of TO bandwidth of a host device to the different processes needs to be managed so that certain processes do not monopolize the TO operation bandwidth of a device.

SUMMARY

Illustrative embodiments provide techniques for managing TO operations in user space.

In one embodiment, an apparatus comprises a host device comprising a processor coupled to memory. The host device is configured to communicate over a network with at least one storage system. The host device is further configured to retrieve data corresponding to a plurality of processes for submitting a plurality of TO operations to the at least one storage system, to identify one or more constraints on the plurality of processes based at least in part on the data, and to control submissions of the plurality of TO operations to the at least one storage system based at least in part on the one or more constraints. The retrieval of the data, the identification of the one or more constraints and the control of the submissions are performed in a user space of the host device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
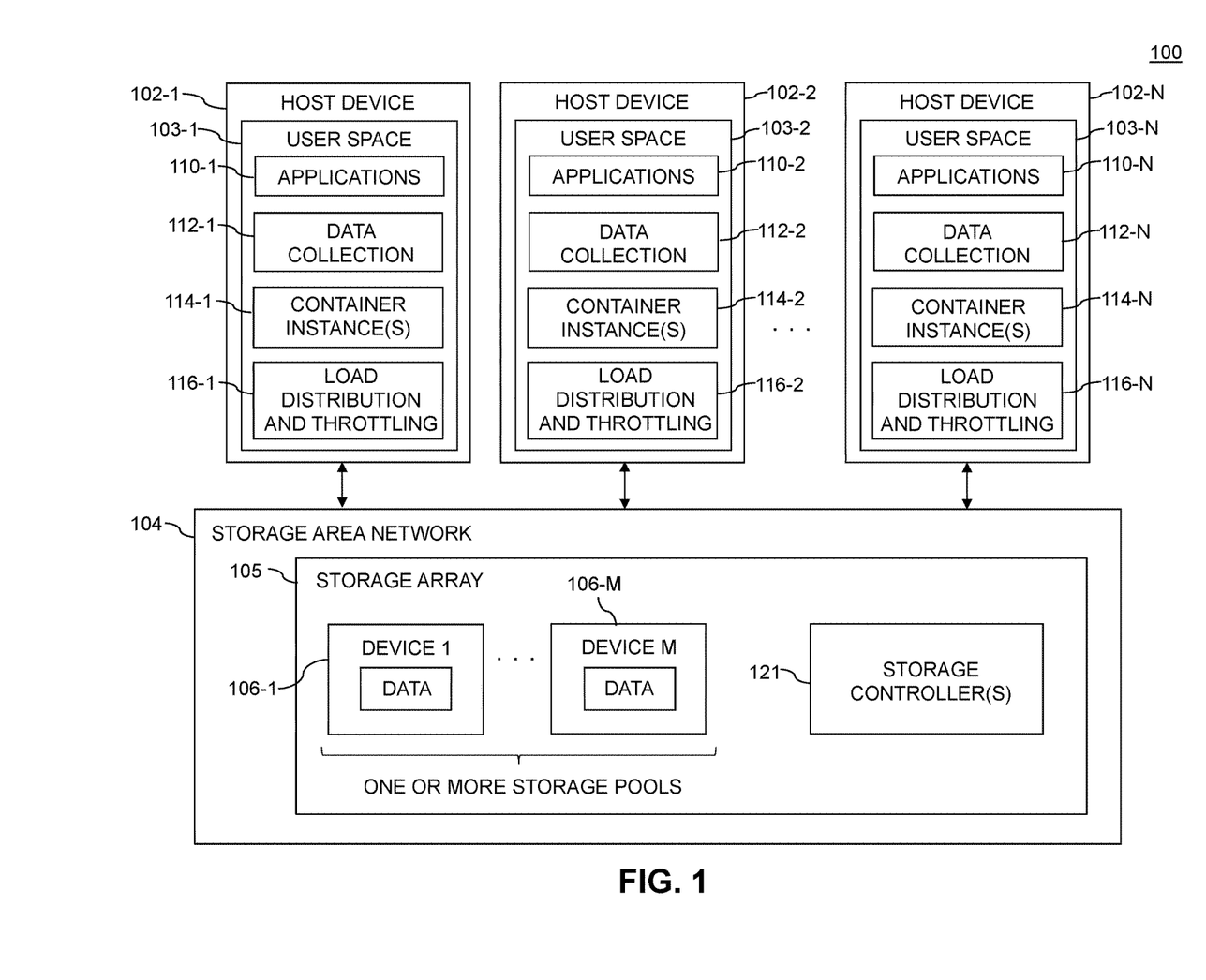
FIG. 1 is a block diagram of an information processing system configured with functionality for managing fairness and throttling of IO operations in user space in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications 110-1, 110-2, . . . 110-N running on one or more of the host devices 102. The storage devices 106 are illustratively arranged in one or more storage pools. The storage array 105 also comprises one or more storage controllers 121 that facilitate IO processing for the storage devices 106. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users or clients associated with respective ones of the host devices 102. The term "user" or "client" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes. Logical storage devices are also referred to herein as simply "logical devices."

Each of the host devices 102 has one or more IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (TB), Gigabit Ethernet or Fibre Channel (FC). Numerous alternative networking arrangements are possible in a given embodiment, as will be appreciated by those skilled in the art.

The host devices 102 comprise respective user spaces 103-1, 103-2, . . . 103-N. The user spaces 103 comprise respective sets of applications 110-1, 110-2, . . . 110-N, respective instances of data collection functionality 112-1, 112-2, . . . 112-N, respective container instances 114-1, 114-2, . . . 114-N, and respective instances of load distribution and throttling logic 116-1, 116-2, . . . 116-N. The host devices 102 also comprise a kernel space portion (not shown). The host devices 102 are configured to deliver TO operations selected from a corresponding set of TO queues to the storage array 105 via one or more paths over the SAN 104. The sources of the TO operations stored in the set of TO queues illustratively include respective processes of one or more applications 110 executing on the host devices 102. Such processes issue JO operations for delivery to the storage array 105 over the SAN 104. Other types of sources of JO operations may be present in a given implementation of system 100.

In one or more embodiments, the host devices 102 comprise respective multi-path input-output (MPIO) drivers. The MPIO drivers collectively comprise a multi-path layer of the host devices 102. The multi-path layer provides automated path selection functionality using respective instances of path selection logic implemented within the MPIO drivers. The MPIO drivers may comprise, for example, otherwise conventional MPIO drivers, such as PowerPath® drivers from Dell Technologies, suitably modified in the manner disclosed herein to provide functionality for load distribution and throttling in the user space. Other types of MPIO drivers from other driver vendors may be suitably modified to incorporate functionality for load distribution and throttling in the user space as disclosed herein. An MPIO driver may be configured to select JO operations from a corresponding set of JO queues for delivery to the storage array 105 over the SAN 104.

The paths over which the JO operations are sent from the host device 102-1 to the storage array 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage array 105. As noted above, the storage devices 106 of the storage array 105 illustratively comprise LUNs or other types of logical storage devices. Examples of such HBAs and storage array ports are illustrated in conjunction with the embodiment of FIG. 5.

In selecting particular ones of the paths for delivery of the IO operations to the storage array 105, an MPIO driver illustratively implements a path selection algorithm that selects particular ones of the paths at least in part as a function of path information such as host device HBA and storage array port, with the path selection algorithm being configured to balance the JO operations over the paths or to achieve other load balancing or performance goals.

Selecting a particular one of multiple available paths for delivery of a selected one of the JO operations of the set of IO queues is more generally referred to herein as "path selection." Path selection as that term is broadly used herein can in some cases involve both selection of a particular IO operation and selection of one of multiple possible paths for accessing a corresponding logical device of one of the storage array 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage array 105 can change over time. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105. Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver, to determine if zoning and masking information has been changed. The predetermined command can comprise, for example, a log sense command, a mode sense command, a vendor unique (VU) command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO drivers may be otherwise configured utilizing well-known multi-pathing software functionality. Such conventional multi-pathing software functionality is suitably modified in illustrative embodiments disclosed herein to support load distribution and throttling in the user space as disclosed herein.

As IO operation technologies have improved, the IO load distribution and throttling functionality has, in some cases, completely moved to the user space 103-1 for some applications. Under conventional approaches, if an application does not use the kernel space for IO operation path submission, then the application will not benefit from load distribution and throttling functionality.

Illustrative embodiments provide techniques to implement container-based IO operation load distribution and throttling in user space IO operation paths. For example, certain storage architectures submit IO operations only from the user space, avoiding kernel IO operation paths. As a result, the IO operations do not use the kernel driver. The embodiments advantageously address this movement to the user space by providing load distribution and throttling for user space IO operation paths.

According to the embodiments, TO operations that are submitted by applications 110-1 for delivery to the storage array 105 do not utilize TO load distribution and throttling functionality residing in the kernel space. These applications 110-1 instead rely on load distribution and throttling logic 116-1 residing in the user space 103-1 which utilizes function calls and libraries in the user space 103-1 to form and establish connections with the storage array 105 from the user space 103-1. The TO load distribution and throttling logic 116-1 does not require the use of the TO stack, interrupts or other functionality in the kernel space. After the establishment of a connection by the TO load distribution and throttling logic 116-1, TO operations for the applications 110-1 are submitted to the storage array 105 by the TO load distribution and throttling logic 116-1 via HBAs without requiring use of TO load distribution and throttling functionality found in the kernel space.

For example, user space-based applications 110-1 residing in the user space 103-1 interface with TO load distribution and throttling logic 116-1 residing in the user space 103-1. The TO load distribution and throttling logic 116-1 is configured to submit TO operations to the storage array 105 via one or more HBAs using user space-based function calls and libraries.

The use of user space load distribution and throttling logic 116-1 which does not utilize the IO stack, interrupts, lock contentions, or other similar kernel space-based functionality for submitting TO operations to the storage array 105, provides higher throughput and efficiency as compared to the use of the kernel space-based TO load distribution and throttling logic. This is because the kernel space-based IO stack, interrupts, lock contentions and other kernel space functionality often requires additional resources or time to process and distribute the TO operations as compared to the function calls and libraries residing in the user space 103-1 which are utilized by the TO load distribution and throttling logic 116-1.

As noted hereinabove, a user space 103-1 comprises one or more container instances 114-1. The container instances 114-1 may comprise, for example, Linux containers (LXCs) (e.g., Docker containers or other types of LXCs). The container instances 114-1 comprise software including different processes, with their corresponding code and dependencies. The container instances 114-1 permit applications 110-1 to execute quickly and efficiently. For example, a container instance 114-1 comprises an executable software package with the required code, system tools, system libraries and settings to run one or more applications 110-1.

Figure 3:
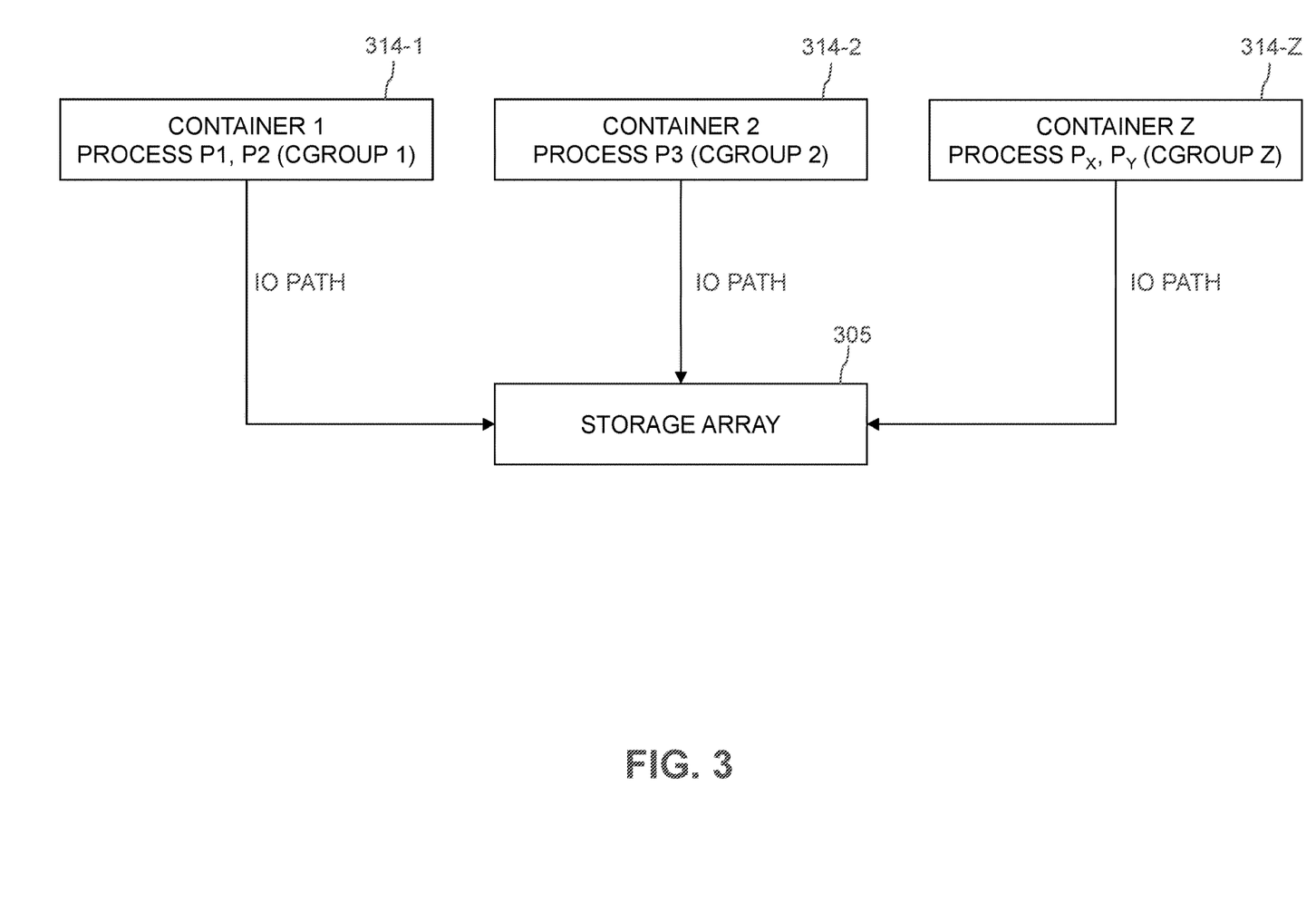
FIG. 3 is a block diagram of a plurality of containers including one or more processes with IO paths to a storage array in an illustrative embodiment.

Referring to, for example, FIG. 3, containers 1, 2, . . . , Z (314-1, 314-2, . . . , 314-Z) each include one or more processes $P_1, P_2, P_3, \ldots P_x, P_y$, which correspond to control groups 1, 2, . . . , Z (cgroup1, cgroup2, . . . , cgroupz). More specifically, container 1 314-1 includes processes $P_1$ and $P_2$ corresponding to cgroup1, container 2 314-2 includes process $P_3$ corresponding to cgroup2, and container Z 314-Z includes processes $P_x$ and $P_y$ corresponding to cgroupz. The containers 1, 2, . . . , Z (314-1, 314-2, . . . , 314-Z) and their corresponding processes $P_1, P_2, P_3, \ldots P_x, P_y$ are used for submitting IO operations associated with the applications 110-1 over IO paths to a storage array 305.

Referring back to FIG. 1, data collection functionality 112 of the host devices 102 accesses or collects process details from the container instances 114/314. The process details include data corresponding to processes (e.g., one or more of the processes $P_1, P_2, P_3, \ldots P_x, P_y$) for submitting IO operations to the storage array 105/305. The process details comprise, for example, one or more constraints on the processes. Such constraints comprise, for example, threshold data rates (e.g., bytes per second (BPS), input-output operations per second (IOPS)) and weights of respective cgroups utilized to determine the number of IO operations to be processed for the respective cgroups. The load distribution and throttling logic 116-1 uses the process details to control IO operation submissions to a given storage system (e.g., storage array 105/305) without utilizing functionality in a kernel space of a host device 102.

Figure 4:
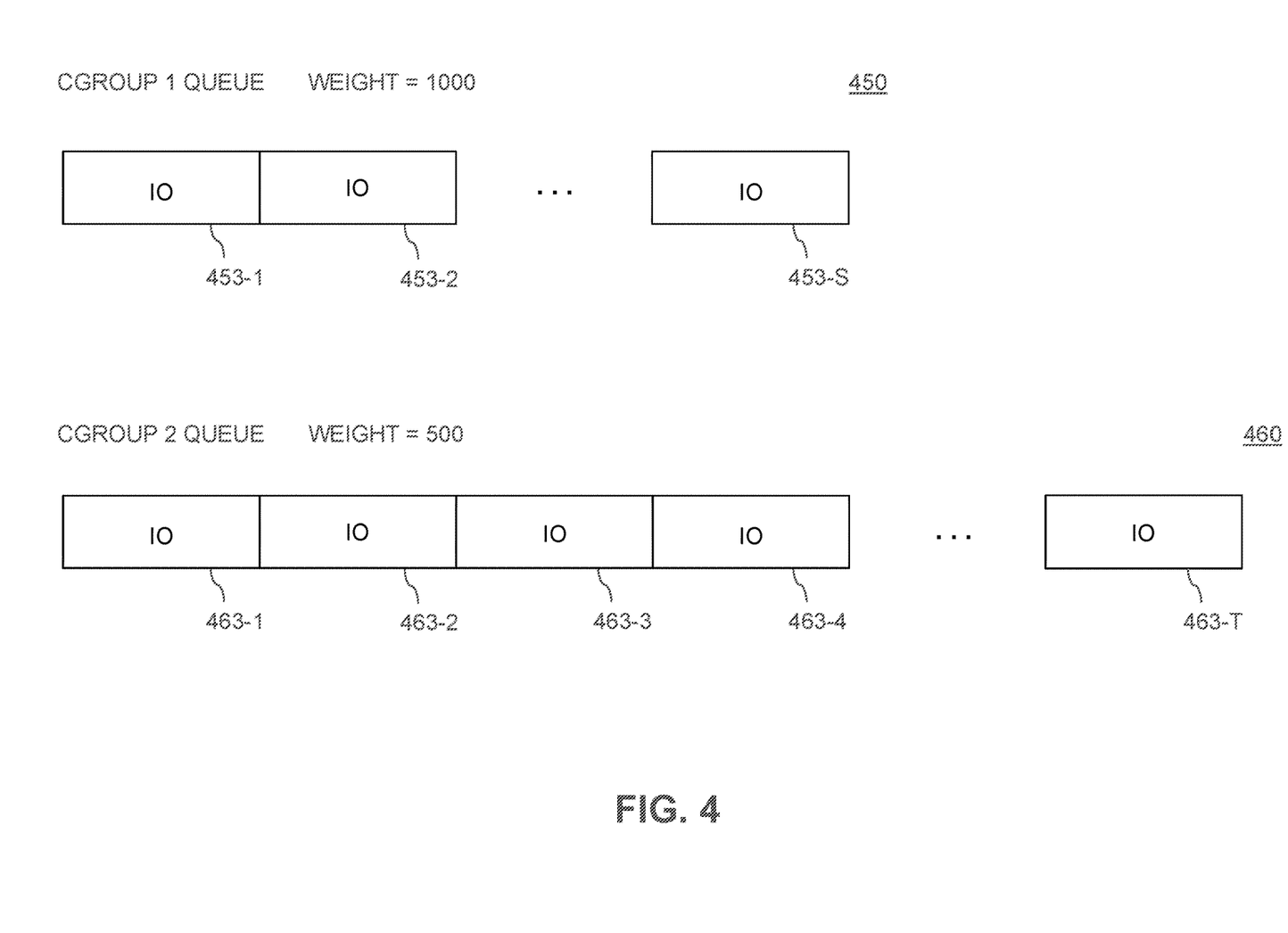
FIG. 4 is a diagram illustrating control group IO queues in an illustrative embodiment.

For example, referring to FIG. 4, respective weights of cgroup1 and cgroup2 are 1000 and 500, and represent proportions of IO operations to be submitted to a given storage system (e.g., storage array 105/305). In more detail, for a given host device 102-1, the host device 102-1 creates a plurality of IO operation queues comprising subsets of IO operations corresponding to respective ones of a plurality of control groups (e.g., in this case cgroup1 and cgroup2). In a non-limiting illustrative example, cgroup1 and cgroup2 correspond to cgroup1 and cgroup2 from containers 1 and 2 (314-1 and 314-2) in FIG. 3. As shown in FIG. 4, an IO operation queue 450 for cgroup1 includes IO operations 453-1, 453-2, . . . , 453-S, and an IO operation queue 460 for cgroup2 includes IO operations 463-1, 463-2, 463-6, 463-4, . . . , 463-T. Since the weight of cgroup1 is twice the weight of cgroup2, the number of IO operations 453 processed from the IO operation queue 450 will be twice the number of IO operations 463 processed from the IO operation queue 460. If there are less IO operations 453 in IO operation queue 450, IO operations 463 may continue to be processed after the IO operations 453 from IO operation queue 450 are exhausted. In a non-limiting example, the weight of process $P_1$ in a sys filesystem is represented as /sys/fs/cgroup/blkio/P1/blkio.weight---1000, and the weight of process $P_3$ in the sys filesystem is represented as/sys/fs/cgroup/blkio/P2/blkio.weight---500.

In connection with implementing load distribution (also referred to as "fairness") in the user space IO operation paths, the load distribution and throttling logic 116-1 of the user space 103-1 generates a staging area for IO operations waiting for submission. The staging area comprises IO operation queues per cgroup of IO operations being submitted to a storage device (e.g., IO operation queues 450 and 460). Depending on the IO proportions set in the container details, the per cgroup queues are processed. For example, more IO operations will be dequeued and submitted from the queue of a cgroup that has more weight than a cgroup having less weight. Referring to the comparative diagram in FIG. 4, the number of IO operations processed from cgroup1 will be double that of cgroup2. The weights may be retrieved and/or accessed by the data collection functionality 112-1.

In some embodiments, the process details comprise threshold data rates (e.g., BPS, IOPS) for IO operations for a given control group (cgroup). The threshold data rates may be, for example, specified by a user when configuring IO operations settings or specified in default or other automated settings in a host device 102-1. In connection with implementing throttling in the user space IO operation paths, the data collection functionality 112-1 reads the threshold BPS and/or IOPS for given cgroups and the load distribution and throttling logic 116-1 uses the threshold(s) for IO operation throttling. For example, when an IO operation is received from a container instance 114-1, the load distribution and throttling logic 116-1 saves the current time as start time. Then, according to an embodiment, for any subsequent IO operation from the container, the load distribution and throttling logic 116-1 calculates the IOPS or BPS according to the following:

IOPS=(number of *IO* operations from start time)/
  (start time–current time)

*BPS*=(number of bytes from start time)/(start time–
  current time)

If the calculated IOPS or BPS is more than the threshold IOPS or BPS for a container, then the load distribution and throttling logic 116-1 starts a timer for time T1 and holds IO operations for the container until the end of time T1.

Time T1 can be calculated as follows:

*T*1=(extra bytes in pending *IO* operation)/*BPS*

If there are no IO operations pending for a cgroup, then a new start time based on the current time is designated and the process repeats.

In controlling the submissions of IO operations, the load distribution and throttling logic 116-1 saves a start time of a given IO operation for a given control group, computes a data rate (e.g., BPS, IOPS) for one or more IO operations subsequent to the given IO operation for the given control group based at least in part on the start time, determines whether the computed data rate exceeds a data rate threshold for the given control group, and throttles IO operations for the given control group for a time period in response to an affirmative determination. The throttling may comprise, for example, a suspension of IO operations or a reduction in amount of IO operations.

According to illustrative embodiments, a host device 102-1 utilizes one or more IO drivers to control the delivery of IO operations to the storage array 105 over at least one path through a network, such as SAN 104. In one example, the IO driver comprises a user-space based driver, such as, but not necessarily limited to, a Storage Performance Development Kit (SPDK) driver. The SPDK driver is an open source community developed user-space based driver including poll hardware to reduce latency and avoid locks. In an embodiment, the user-space based driver supports multi-path delivery of IO operations over a plurality of paths through the network.

Various scheduling algorithms, load balancing algorithms and/or other types of algorithms can be utilized by the IO driver in delivering IO operations to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands and/or NVMeoF commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

It is assumed that each of the other host devices 102 is configured in a manner similar to that described above and elsewhere herein for the first host device 102-1. The other host devices 102 of the system 100 are therefore also configured to communicate over the SAN 104 with the storage array 105. The other host devices 102 are each similarly configured to deliver 10 operations from its corresponding one of the sets of applications 110 to the storage array 105 over one or more paths through the SAN 104, and to perform the disclosed functionality for delivering IO operations, retrieving and identifying process details of one or more containers and performing load balancing and throttling in a user space. Accordingly, functionality described above in the context of the first host device 102-1 is assumed to be similarly performed by each of the other host devices 102-2 through 102-N.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 within the system 100 may utilize PCIe connections or other types of connections implemented over one or more networks such as SAN 104. For example, illustrative embodiments can use interfaces such as Internet SCSI (iSCSI), Serial Attached SCSI (SAS) and Serial Advanced Technology Attachment (SATA). Numerous other interfaces and associated communication protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of arrangements, including, by way of example, active-passive arrangements, active-active arrangements, ALUA/ANA arrangements and/or DALUA/DANA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, applications 110, instances of data collection functionality 112, container instances 114, and instances of load distribution and throttling logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process 200 as shown includes steps 201 through 205, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Other arrangements of host device components, storage array components and/or other system components can be configured to perform at least portions of one or more of the steps in other embodiments.

In step 201, data corresponding to a plurality of processes for submitting a plurality of IO operations to the at least one storage system is retrieved. The plurality of processes correspond to a plurality of control groups, and the plurality of control groups correspond to a plurality of containers. In step 203, one or more constraints on the plurality of processes are identified based at least in part on the data.

In step 205, submissions of the plurality of IO operations to the at least one storage system are controlled based at least in part on the one or more constraints. The retrieval of the data, the identification of the one or more constraints and the control of the submissions are performed in a user space of the host device without utilizing functionality in a kernel space of the host device.

According to an illustrative embodiment, the one or more constraints comprise respective weights corresponding to respective ones of the plurality of control groups. The respective weights represent proportions of the plurality of IO operations to be submitted to the at least one storage system. Controlling the submissions of the plurality of IO operations comprises creating a plurality of IO operation queues comprising subsets of the plurality of IO operations corresponding to respective ones of the plurality of control groups, and processing the subsets of the plurality of IO operations in the plurality of IO operation queues according to the respective weights.

According to an illustrative embodiment, the one or more constraints comprise respective data rate thresholds corresponding to respective ones of the plurality of control groups. For example, the respective data rate thresholds comprise a BPS threshold and/or an IOPS threshold. Controlling the submissions of the plurality of IO operations comprises saving a start time of a given IO operation for a given control group of the plurality of control groups, computing a data rate for one or more JO operations subsequent to the given JO operation for the given control group based at least in part on the start time, determining whether the computed data rate exceeds a data rate threshold for the given control group, and suspending JO operations for the given control group for a time period in response to an affirmative determination.

In one or more embodiments, controlling the submission of the plurality of IO operations comprises processing a plurality of subsets of the plurality of IO operations according to the respective weights corresponding to respective ones of the plurality of subsets. Controlling the submission of the plurality of IO operations may also comprise computing a data rate for a subset of the plurality of IO operations, determining whether the computed data rate exceeds a data rate threshold for the subset, and throttling IO operations for the subset in response to an affirmative determination.

Figure 2:
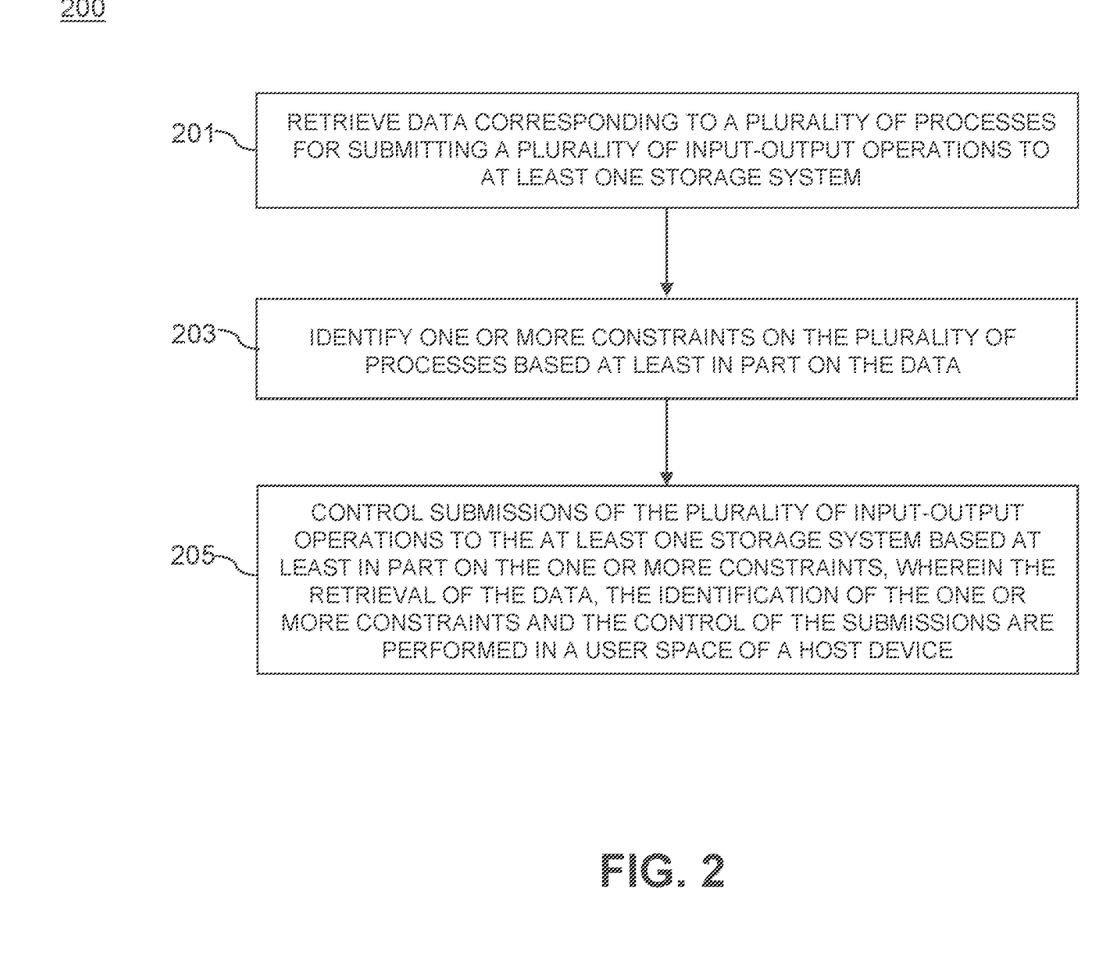
FIG. 2 is a flow diagram of a process for managing fairness and throttling of IO operations in user space in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for load distribution and throttling of IO operations in the user space. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements of data clients on storage nodes within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 5:
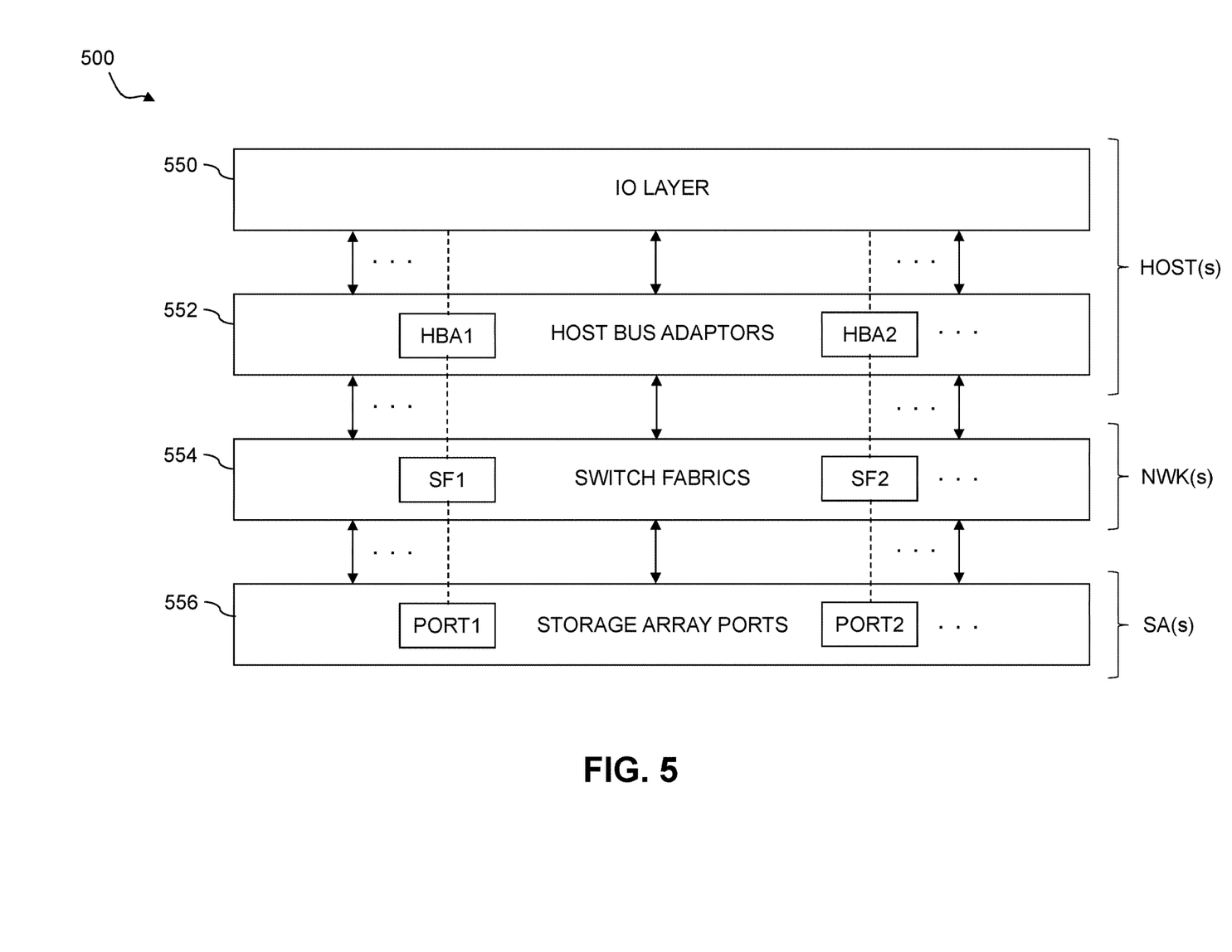
FIG. 5 is a block diagram showing multiple layers of a layered system architecture that includes functionality for managing fairness and throttling of IO operations in user space in an illustrative embodiment.

Referring now to FIG. 5, another illustrative embodiment is shown. In this embodiment, an information processing system 500 is configured in accordance with a layered system architecture that includes an IO layer 550, an HBA layer 552, a switch fabric layer 554 and a storage array port layer 556. The IO layer 550 and the HBA layer 552 are associated with one or more host devices, the switch fabric layer 554 is associated with one or more SANs or other types of networks ("NWKs"), and the storage array port layer 556 is associated with one or more storage arrays ("SAs"). The IO layer 550 comprises one or more IO drivers implemented in respective host devices.

In the system 500, different paths may be used for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 5 embodiment can illustratively have a set of n paths to a shared storage array, or alternatively different ones of the host devices can have different numbers and types of paths to the storage array.

Some implementations of the FIG. 5 embodiment can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device of system 500 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the IO drivers of an IO layer 550 is typically supported. Other types of host devices using other operating systems such as AIX in some implementations do not necessarily support such automated path discovery, in which case alternative techniques can be used to discover paths.

The illustrative embodiments disclosed herein can provide a number of significant advantages relative to conventional arrangements. For example, unlike conventional arrangements, where load distribution and throttling support for containers is linked to the kernel space, the embodiments provide techniques to implement container-based fair load distribution and throttling in user space IO operation paths. The embodiments advantageously provide per container throttling and load distribution capabilities for user space IO operation submissions, which enable applications to divide their share of IO operation bandwidth. As a result, one application will not be permitted to use all of the IOPS for a device. Additionally, the embodiments permit users to customize throttling per container by specifying the BPS or IOPS.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of data collection functionality 112 and of load distribution and throttling logic 116 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, compute nodes, storage nodes, storage arrays, storage devices, processors, memories, applications, IO queues, IO drivers, container instances and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
  a host device comprising a processor coupled to memory, the host device being configured to communicate over a network with at least one storage system, wherein the host device is further configured to perform the following:
    to retrieve data corresponding to a plurality of processes for submitting a plurality of input-output operations to the at least one storage system;
    to identify one or more constraints on the plurality of processes based at least in part on the data; and
    to control submissions of the plurality of input-output operations to the at least one storage system based at least in part on the one or more constraints;
  wherein the retrieval of the data, the identification of the one or more constraints and the control of the submissions are performed in a user space of the host device; and wherein, in controlling the submissions of the plurality of input-output operations, the host device is configured to process a plurality of subsets of the plurality of input-output operations according to respective weights corresponding to respective ones of the plurality of subsets, the respective weights representing proportions of the plurality of input-output operations to be submitted to the at least one storage system.

2. The apparatus of claim 1 wherein the retrieval of the data, the identification of the one or more constraints and the control of the submissions are performed without utilizing functionality in a kernel space of the host device.

3. The apparatus of claim 1 wherein the plurality of processes correspond to a plurality of control groups.

4. The apparatus of claim 3 wherein the plurality of control groups correspond to a plurality of containers.

5. The apparatus of claim 3 wherein the one or more constraints comprise respective data rate thresholds corresponding to respective ones of the plurality of control groups.

6. The apparatus of claim 5 wherein the respective data rate thresholds comprise at least one of a bytes per second threshold and an input-output operations per second threshold.

7. The apparatus of claim 5 wherein, in controlling the submissions of the plurality of input-output operations, the host device is configured:
to save a start time of a given input-output operation for a given control group of the plurality of control groups;
to compute a data rate for one or more input-output operations subsequent to the given input-output operation for the given control group based at least in part on the start time;
to determine whether the computed data rate exceeds a data rate threshold for the given control group; and
to suspend input-output operations for the given control group for a time period in response to an affirmative determination.

8. An apparatus comprising:
a host device comprising a processor coupled to memory, the host device being configured to communicate over a network with at least one storage system, wherein the host device is further configured to perform the following:
to retrieve data corresponding to a plurality of processes for submitting a plurality of input-output operations to the at least one storage system;
to identify one or more constraints on the plurality of processes based at least in part on the data; and
to control submissions of the plurality of input-output operations to the at least one storage system based at least in part on the one or more constraints;
wherein the retrieval of the data, the identification of the one or more constraints and the control of the submissions are performed in a user space of the host device;
wherein the plurality of processes correspond to a plurality of control groups; and
wherein the one or more constraints comprise respective weights corresponding to respective ones of the plurality of control groups, the respective weights representing proportions of the plurality of input-output operations to be submitted to the at least one storage system.

9. The apparatus of claim 8 wherein, in controlling the submissions of the plurality of input-output operations, the host device is configured:
to create a plurality of input-output operation queues comprising subsets of the plurality of input-output operations corresponding to respective ones of the plurality of control groups; and
to process the subsets of the plurality of input-output operations in the plurality of input-output operation queues according to the respective weights.

10. An apparatus comprising:
a host device comprising a processor coupled to memory, the host device being configured to communicate over a network with at least one storage system, wherein the host device is further configured to perform the following:
to retrieve data corresponding to a plurality of processes for submitting a plurality of input-output operations to the at least one storage system;
to identify one or more constraints on the plurality of processes based at least in part on the data; and
to control submissions of the plurality of input-output operations to the at least one storage system based at least in part on the one or more constraints;
wherein the retrieval of the data, the identification of the one or more constraints and the control of the submissions are performed in a user space of the host device; and
wherein, in controlling the submissions of the plurality of input-output operations, the host device is configured:
to compute a data rate for a subset of the plurality of input-output operations;
to determine whether the computed data rate exceeds a data rate threshold for the subset; and
to throttle input-output operations for the subset in response to an affirmative determination.

11. The apparatus of claim 10 wherein the plurality of processes correspond to a plurality of control groups.

12. The apparatus of claim 11 wherein the one or more constraints comprise respective data rate thresholds corresponding to respective ones of the plurality of control groups.

13. A method comprising:
retrieving data corresponding to a plurality of processes for submitting a plurality of input-output operations to at least one storage system;
identifying one or more constraints on the plurality of processes based at least in part on the data; and
controlling submissions of the plurality of input-output operations to the at least one storage system based at least in part on the one or more constraints;
wherein the method is implemented by a host device, the host device comprising a processor coupled to a memory;
wherein the retrieval of the data, the identification of the one or more constraints and the control of the submissions are performed in a user space of the host device; and
wherein, in controlling the submissions of the plurality of input-output operations, the host device processes a plurality of subsets of the plurality of input-output operations according to respective weights corresponding to respective ones of the plurality of subsets, the respective weights representing proportions of the plurality of input-output operations to be submitted to the at least one storage system.

14. The method of claim 13 wherein the retrieval of the data, the identification of the one or more constraints and the control of the submissions are performed without utilizing functionality in a kernel space of the host device.

15. The method of claim 13 wherein the plurality of processes correspond to a plurality of control groups.

16. The method of claim 15 wherein the one or more constraints comprise respective weights corresponding to respective ones of the plurality of control groups, the respective weights representing proportions of the plurality of input-output operations to be submitted to the at least one storage system.

17. The method of claim 16 wherein controlling the submissions of the plurality of input-output operations comprises:
creating a plurality of input-output operation queues comprising subsets of the plurality of input-output operations corresponding to respective ones of the plurality of control groups; and
processing the subsets of the plurality of input-output operations in the plurality of input-output operation queues according to the respective weights.

18. A computer program product comprising a non-transitory processor-readable storage medium having stored therein program code of one or more software programs, wherein the program code, when executed by a host device comprising a processor coupled to a memory, causes the host device:
to retrieve data corresponding to a plurality of processes for submitting a plurality of input-output operations to at least one storage system;
to identify one or more constraints on the plurality of processes based at least in part on the data; and
to control submissions of the plurality of input-output operations to the at least one storage system based at least in part on the one or more constraints;
wherein the retrieval of the data, the identification of the one or more constraints and the control of the submissions are performed in a user space of the host device; and
wherein, in controlling the submissions of the plurality of input-output operations, the program code causes the host device to process a plurality of subsets of the plurality of input-output operations according to respective weights corresponding to respective ones of the plurality of subsets, the respective weights representing proportions of the plurality of input-output operations to be submitted to the at least one storage system.

19. The computer program product of claim 18 wherein the retrieval of the data, the identification of the one or more constraints and the control of the submissions are performed without utilizing functionality in a kernel space of the host device.

20. The computer program product of claim 18 wherein, in controlling the submissions of the plurality of input-output operations, the program code causes the host device:
to compute a data rate for a subset of the plurality of input-output operations;
to determine whether the computed data rate exceeds a data rate threshold for the subset; and
to throttle input-output operations for the subset in response to an affirmative determination.

\* \* \* \* \*